United States Patent
Kawas et al.

(10) Patent No.: US 11,651,275 B2
(45) Date of Patent: May 16, 2023

(54) TREE-BASED ASSOCIATIVE DATA AUGMENTATION

(71) Applicants: International Business Machines Corporation, Armonk, NY (US); The Regents of the University of California, Oakland, CA (US)

(72) Inventors: Ban Kawas, San Jose, CA (US); Siavash Mirarab, Del Mar, CA (US); Erfan Sayyari, San Diego, CA (US)

(73) Assignees: INTERNATIONAL BUSINESS MACHINES CORPORATION, Armonk, NY (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 940 days.

(21) Appl. No.: 16/544,120

(22) Filed: Aug. 19, 2019

(65) Prior Publication Data

US 2021/0056456 A1 Feb. 25, 2021

(51) Int. Cl.
*G06N 20/00* (2019.01)
*G06N 5/04* (2023.01)
*G06F 16/906* (2019.01)
*G06F 17/18* (2006.01)
*G06F 16/22* (2019.01)

(52) U.S. Cl.
CPC ......... *G06N 20/00* (2019.01); *G06F 16/2246* (2019.01); *G06F 16/906* (2019.01); *G06F 17/18* (2013.01); *G06N 5/04* (2013.01)

(58) Field of Classification Search
CPC ........ G06N 20/00; G06N 5/04; G06F 16/906; G06F 16/2246; G06F 17/18

USPC ............................................. 706/12; 606/12
See application file for complete search history.

(56) References Cited

U.S. PATENT DOCUMENTS

| 5,414,836 A | 5/1995 | Baer et al. |
| 9,104,961 B2* | 8/2015 | Gordon ................... G06N 7/01 |
| 9,324,034 B2 | 4/2016 | Gupta et al. |
| 9,836,701 B2 | 12/2017 | Chen et al. |

(Continued)

FOREIGN PATENT DOCUMENTS

| GB | 2516627 A | 2/2015 |
| WO | 2015130986 | 9/2015 |
| WO | 2019067257 | 4/2019 |

OTHER PUBLICATIONS

Goessling, Marc, "High-Dimensional Generative Models: Shrinkage, Composition and Autoregression", PhD Dissertation, The University of Chicago, Chicago, IL, Aug. 2016, 120 pages.*

(Continued)

*Primary Examiner* — Robert Stevens
(74) *Attorney, Agent, or Firm* — Amin, Turocy & Watson, LLP

(57) ABSTRACT

Techniques facilitating tree-based associative data augmentation are provided. In one example, a computer-implemented method comprises: generating, by a device operatively coupled to a processor, a model probability distribution for one or more measured samples based on conditional probabilities for respective nodes of a tree structure associated with dimensions of the one or more measured samples; and producing, by the device, synthetic samples by drawing from the model probability distribution for at least one of the one or more measured samples.

25 Claims, 14 Drawing Sheets

(56) References Cited

U.S. PATENT DOCUMENTS

| | | | | |
|---|---|---|---|---|
| 2004/0243548 | A1* | 12/2004 | Hulten | G06F 16/3346 |
| 2016/0300036 | A1* | 10/2016 | Ramazzotti | G06N 20/00 |
| 2017/0308846 | A1 | 10/2017 | de Mars et al. | |
| 2018/0122515 | A1 | 5/2018 | Apte et al. | |
| 2019/0042917 | A1* | 2/2019 | Gurwicz | G06N 5/01 |
| 2019/0256924 | A1* | 8/2019 | Vogelstein | C12Q 1/6858 |
| 2019/0377984 | A1* | 12/2019 | Ghanta | G06F 18/2193 |
| 2020/0311559 | A1* | 10/2020 | Chattopadhyay | G06N 5/01 |

OTHER PUBLICATIONS

Fathalla, Karma Mohamed Gaber, "OFSET-mine: An Integrated Framework for Cardiovascular Diseases Risk Prediction based on Retinal Vascular Function", Doctor of Philosophy thesis, Aston, University, School of Engineering and Applied Science, Birmingham , UK, Jun. 2018, 168 pages.*

Paulson, Christopher, et al., "Multi-sensor synthetic data generation for performance characterization", SPIE Defense + Commercial Sensing, Baltimore, MD, Apr. 14-18, 2019, SPIE vol. 10987, pp. 1098707-1-1098707-10.*

Merriam Webster's Collegiate Dictionary, 10th edition, Merriam-Webster, Inc., Springfield, MA, © 2000, pp. 218 and 791 (definitions of cluster and normalize).*

Microsoft Computer Dictionary, 5th Edition, Microsoft Press, Redmond, WA, © 2002, pp. 104-105, 238-239, 264, 304, 336, 366, 368, 391 and 529 (definitions of cluster, cluster analysis, clustering, graph, identifier, label, metadata, node, normalize, parent/child and tree).*

Irving, William, et al., "Classification of targets in synthetic aperture radar imagery via quantized grayscale matching", SPIE Conf. on Algorithms for Synthetic Aperture Radar Imagery VI, Orlando, FL, Apr. 1999, SPIE vol. 3721, pp. 320-331.*

Paulson, Christopher, et al., "Articulation study for SAR ATR baseline algorithm", SPIE Defense + Commercial Sensing, Baltimore, MD, Apr. 14-18, 2019, SPIE vol. 10987, pp. 109870L-1-109870L-17.*

"Graph (discrete mathematics)", Wikipedia, downloaded from: https://en.wikipedia.org/wiki/Graph_(discrete_mathematics), on Sep. 26, 2022, pp. 1-10 (graph, tree, forest).*

Lee, Chen-Yu, et al., "Generalized Pooling Functions in Convolutional Neural Networks: Mixed, Gated, and Tree", AISTATS, Cadiz, Spain, JMLR: W&CP vol. 51, © 2016, pp. 464-472.*

Cui, Xiaodong, et al., "Data Augmentation for Deep Neural Network Acoustic Modeling", IEEE Transactions on Audio, Speech, and Language Processing, vol. 23, No. 9, Sep. 2015, pp. 1469-1477.*

Huan, Jun, et al., "SPIN: Mining Maximal Frequent Subgraphs from Graph Databases", KDD '04, Seattle, WA, Aug. 22-25, 2004, pp. 581-586.*

Sayyari, et al., TADA: Phylogenetic augmentation of mircrobiome samples enhances phenotype classification, Bioinformatics of Microbes and Microbiomes, Jan. 29, 2019, 9 Pages.

Sayyari, et al., Supplemental Materials: Phylogeny—aware data augmentation for enhancing machine learning applied to microbiome data, Jan. 29, 2019, 9 Pages.

Janssen et al., Phylogenetic Placement of Exact Amplicon Sequences Improves Associations with Clinical Information, M Systems, May 2018, 14 Pages, vol. 3, Issue 3.

Gevers, et al., The treatment-naive microbiome in new-onset Crohn's disease, Cell Press, Mar. 12, 2014, pp. 382-392, vol. 15.

Morton et al., Balance trees reveal microbial niche differentiation, MSystems, Jan. 2017, 11 Pages, vol. 2, Issue 1.

* cited by examiner $F_1$: Features for sample $S_1$ $F_2$: Features for sample $S_2$ $F_n$: Features for sample $S_n$

TREE-BASED ASSOCIATIVE DATA AUGMENTATION

BACKGROUND

The subject disclosure relates to machine learning, and more specifically, to techniques for generating and improving training sets for machine learning algorithms.

SUMMARY

The following presents a summary to provide a basic understanding of one or more embodiments of the invention. Its sole purpose is to present concepts in a simplified form as a prelude to the more detailed description that is presented later. In one or more embodiments described herein, systems, computer-implemented methods, apparatus and/or computer program products that facilitate generating and improving training sets for machine learning algorithms are described.

According to an embodiment, a system can include a memory that stores computer executable components and a processor that executes computer executable components stored in the memory. The computer executable components can include a generative model component that defines a probability distribution, where the probability distribution is parameterized based on one or more measured samples using conditional probabilities determined for respective nodes of a tree structure associated with dimensions of the one or more measured samples. The computer executable components can further include a data augmentation component that generates synthetic samples by drawing from the model probability distribution for at least one of the one or more measured samples.

According to another embodiment, a computer-implemented method can include generating, by a device operatively coupled to a processor, a model probability distribution for one or more measured samples based on conditional probabilities for respective nodes of a tree structure associated with dimensions of the one or more measured samples, and producing, by the device, synthetic samples by drawing from the model probability distribution for at least one of the one or more measured samples.

According to a further embodiment, a computer program product for tree-based associative data augmentation can include a computer readable storage medium having program instructions embodied therewith. The program instructions can be executable by a processing component to cause the processing component to generate a model probability distribution for one or more measured samples based on conditional probabilities for respective nodes of a tree structure associated with dimensions of the one or more measured samples and to produce synthetic samples by drawing from the model probability distribution for at least one of the one or more measured samples.

According to an additional embodiment, a computer-implemented method can include parameterizing, by a device operatively coupled to a processor, prior probability distributions of respective nodes in a tree representing a measurement based on observed features of left and right subordinate nodes of the respective nodes of the tree, parameterizing, by the device, a posterior distribution characterizing observed features of a measurement associated with the tree using the prior probability distributions of the respective nodes, and generating, by the device, at least one new sample by drawing from the posterior distribution, wherein the at least one new sample comprises a synthetic measurement corresponding to the measurement associated with the tree.

DETAILED DESCRIPTION

The following detailed description is merely illustrative and is not intended to limit embodiments and/or application or uses of embodiments.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The number of samples available for training a machine learning model, e.g., a model utilized by a classifier, can affect the performance (e.g., in terms of accuracy, generalization, and/or other factors) of the model. For instance, a classifier that is associated with a large number of parameters, but a comparatively small dataset can result in overfitting, where the associated model does not generalize well from the training dataset to a test dataset. This overfitting can be more severe in cases where there is an unbalanced distribution of class labels or unobserved confounding factors in the training dataset. Moreover, samples associated with high-dimensional data, such as microbiome data, decision trees, actuarial models, directory structures, or the like, can be associated with tree structures that introduce further complexity in training a machine learning model. As a result, it is desirable to implement techniques to improve the training process for a machine learning model in the presence of complex data, such as data associated with a tree structure.

Figure 1:
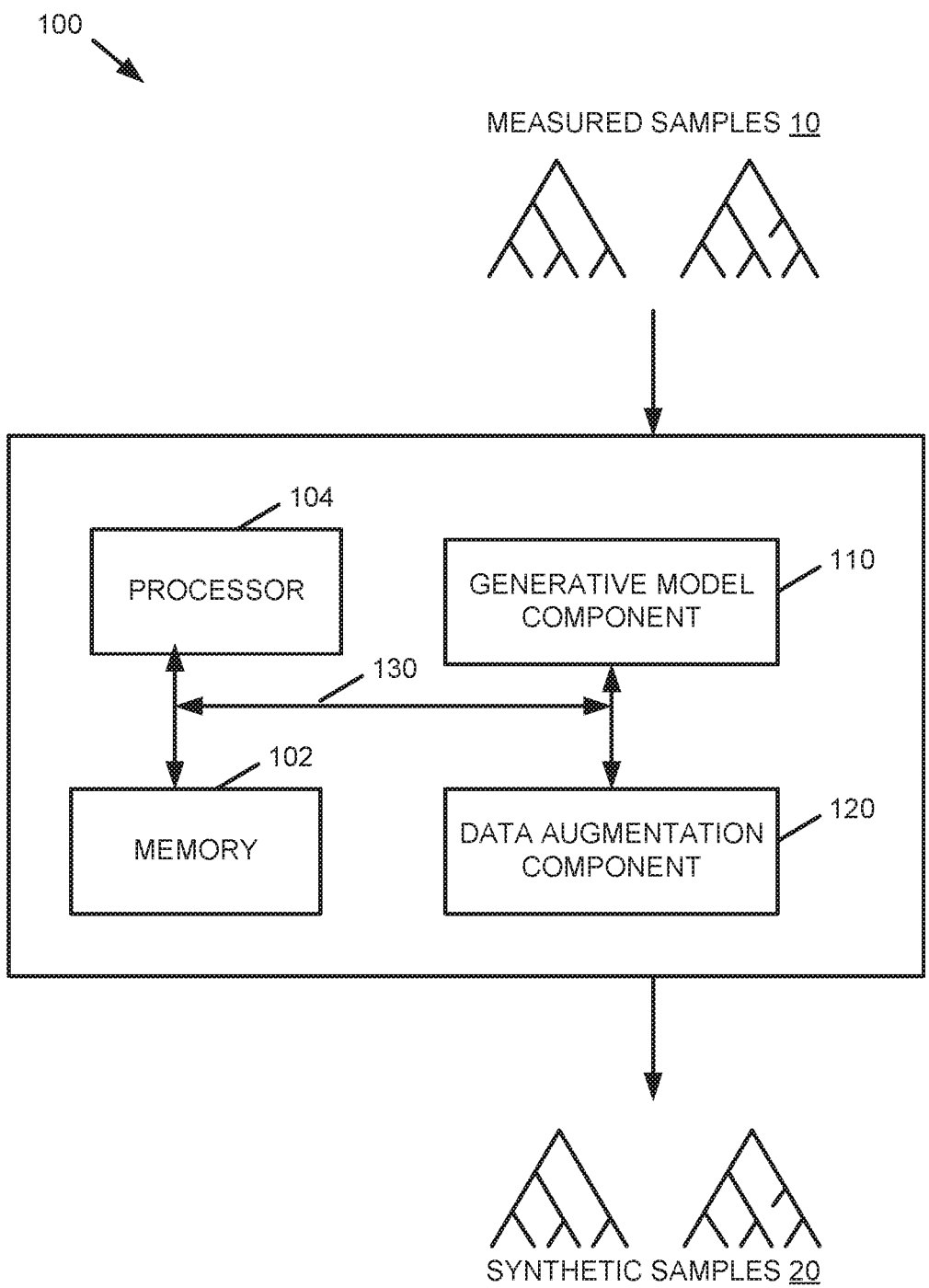
FIG. 1 is a block diagram of a system that facilitates tree-based associative data augmentation according to one or more embodiments described herein.

With reference now to the drawings, FIG. 1 illustrates a block diagram of a system 100 that facilitates tree-based associative data augmentation according to one or more embodiments described herein. As shown in FIG. 1, system 100 includes a memory 102 that can store computer executable components and a processor 104 that can execute computer executable components stored in the memory 102. The computer executable components executed by the processor 104 can include a generative model component 110 that can define a probability distribution that is parameterized based on a set of (e.g., one or more) measured samples 10. In an aspect, the measured samples 10 are configured in a tree structure such that respective nodes of the tree structure are associated with dimensions of sample measurements associated with the respective measured samples 10. The tree structure employed by the respective measured samples 10 is described in further detail below with respect to FIG. 2.

In an aspect, the generative model component 110 can parameterize the probability distribution based on the measured samples 10 using conditional probabilities determined for respective nodes of the tree structure associated with the measured samples 10. This probability distribution can then be provided to a data augmentation component 120 (e.g., as further stored by the memory 102 and executed by the processor 104), which can generate synthetic samples 20 by drawing from the probability distribution for at least one of the measured samples 10. In general, a given measured sample 10 is an imperfect representation of its underlying data, e.g., variations of a measured sample 10 could be observed in place of the actual measured sample 10 under different conditions, sampling techniques, etc. The probability distribution generated by the generative model component 110 and utilized by the data augmentation component 120 can leverage relationships among data captured by a set of measured samples 10 to generate synthetic samples 20 according to those relationships.

In some cases, gathering and/or using additional measured samples 10 can be infeasible or expensive due to the complexity of the samples, the availability of underlying data, and/or other factors. As a result, the data augmentation component 120 can provide data augmentation for datasets with tree-based structures to add new synthetic samples 20 based on the existing measured samples 10. In an aspect, the data augmentation component 120 can incorporate tree-based hierarchical structures that relate inter-sample patterns when creating synthetic samples 20. As a result, the synthetic samples 20 can be constrained based on those patterns and/or relationships, thereby improving the relevance of the resulting dataset in comparison to independent samples. The techniques described herein can be further extended to remove imbalances in training data, both with respect to hidden (e.g., confounding) and observed variables. Techniques for reducing sample imbalance in this manner are described in further detail below with respect to FIGS. 8-10.

As described above, the processor 104 can be utilized to implement one or more of the generative model component 110 and the data augmentation component 120. The processor(s) 104 can be connected via a data bus 130 to one or more additional sub-components, such as the memory 102 and/or other suitable sub-components. In various embodiments, the processor 104 shown in FIG. 1 can be or include hardware, software (e.g., a set of threads, a set of processes, software in execution, etc.) or a combination of hardware and software that performs a computing task (e.g., a computing task associated with received data). For example, the processor 104 can process large amounts of complex, multidimensional data samples and/or perform other operations that cannot be performed by a human (e.g., are greater than the capability of a human mind). For example, the amount of data processed, the speed of processing of the data and/or the data types processed by the processor 104 over a certain period of time can be respectively greater, faster and different than the amount, speed and data type that can be processed by a single human mind over the same period of time. For example, data processed by the processor 104 can be raw data (e.g., raw textual data, raw numerical data, etc.) and/or compressed data (e.g., compressed textual data, compressed numerical data, etc.) associated with one or more computing devices. Moreover, the processor 104 can be fully operational towards performing one or more other functions (e.g., fully powered on, fully executed, etc.) while also processing the above-referenced data. Additionally, by generating and processing data samples as described above, the processor 104 in connection with various aspects as described herein can facilitate the automation of tasks, such as classification tasks involving complex, multi-dimensional data samples, which were not previously able to be automated with a useful or reasonable degree of accuracy.

Figure 2:
FIG. 2 is a diagram of respective example sample structures that can be utilized according to one or more embodiments described herein.
Figure 2:
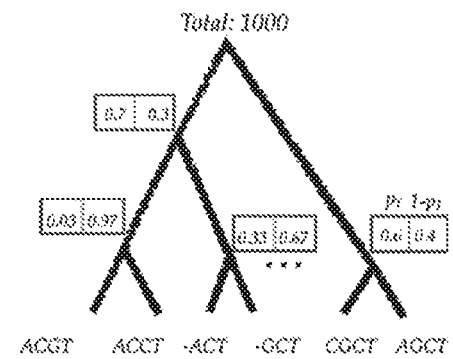
Figure 2:
Figure 2:
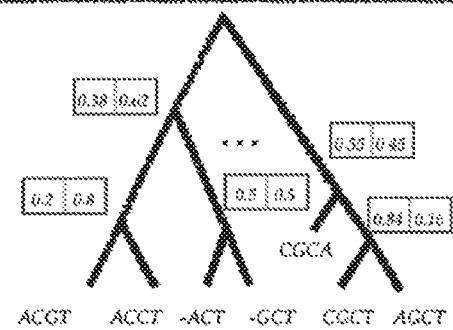
Figure 2:
Figure 2:
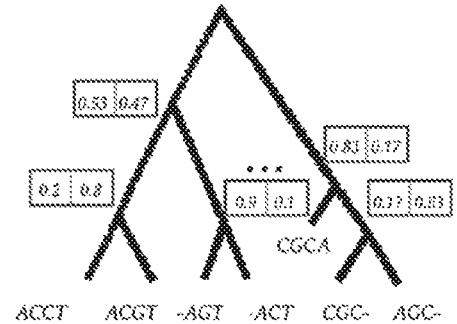

Turning now to FIG. 2, a diagram 200 that illustrates example data samples and corresponding tree structures that can be utilized by system 100 is illustrated. While FIG. 2 and various aspects of the drawings and description that follow are directed to the specific, non-limiting example of microbiome data and phylogenic structures, it should be appreciated that this example is provided merely for purposes of explanation and that other data types could be used. For instance, computer system directory structures, decision trees, actuarial models, and/or any other data that can be represented via a tree structure could be utilized in addition to, or in place of, microbiome data without departing from the scope of the description or the claimed subject matter. Further, while FIG. 2 and various aspects of the drawings and description that follow illustrate examples utilizing binary tree structures, it should also be appreciated that similar concepts to those explained herein could be extended to other types of tree structures, e.g., tree structures with three or more branches per node. Unless explicitly stated otherwise, neither the description or the claimed subject matter are intended to be limited to any particular type(s) of data and/or tree structure(s).

As shown in diagram 200, sample processing can begin from a set of n measured samples 10, denoted in diagram 200 as $S_1$ through $S_n$, and their corresponding counts, denoted in diagram 200 as $C_1$ through $C_n$. From these samples, the generative model component 110 can build tree structures for each of the n samples. By way of non-limiting example, as shown in diagram 200, a sample can include a group of raw sequences or patterns (e.g., subclades, etc.), and counts of the respective sequences or patterns can be either included in the sample or computed based on the sequences or patterns present in the sample. Based on these sequences and their corresponding counts, tree structures for the respective patterns can be generated using an insertion method. In this example, the samples can have a uniform number of data points (e.g., 1000 data points in the example shown in diagram 200 and/or other suitable numbers) and/or different numbers of data points.

In another example, data contained within a sample can implicitly or explicitly be associated with a tree structure (e.g., in the case of files or directories in a directory structure, etc.), such that respective trees for the given samples can be generated using the inherent structure of the sample. As yet another example, respective samples can be preconfigured to have tree structures such as those shown in diagram 200 without requiring pre-processing of the samples.

Figure 3:
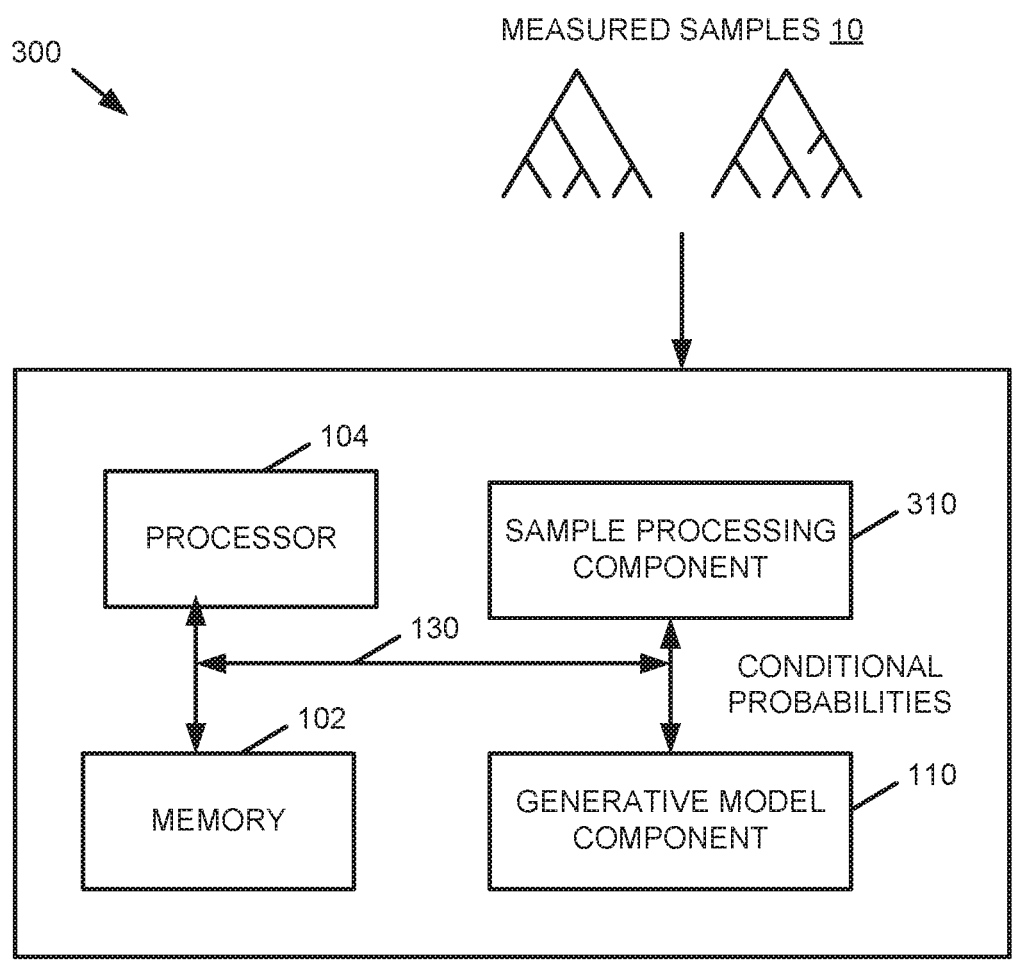
FIG. 3 is a block diagram of a system that facilitates determining conditional probabilities from tree structures associated with measured samples according to one or more embodiments described herein.

Based on the tree structure associated with each sample, the conditional probabilities of encountering each data point associated with the tree structure can be inferred. With reference to FIG. 3, and further referring to diagram 200 in FIG. 2, a system 300 that facilitates determining conditional probabilities from tree structures associated with measured samples according to one or more embodiments described herein is illustrated. Repetitive description of like elements employed in other embodiments described herein is omitted for sake of brevity. System 300 as shown in FIG. 3 includes a memory 102 that can store computer executable components and a processor 104 that can execute computer executable components stored in the memory 102 in a similar manner to system 100. The computer executable components can include a sample processing component 310, which can determine the conditional probabilities for the respective nodes of a tree structure associated with the dimensions of the sample measurements (e.g., the subclades and/or other data points as illustrated in diagram 200) for respective measured samples 10. For instance, based on the rate at which respective measurement values occur in a given sample, or a selection of samples, conditional probabilities can be assigned to respective branches in the tree structure at respective nodes of the tree. For instance, as shown in diagram 200, respective nodes of each tree structure can be associated with conditional probabilities that indicate the probability of a given measurement associated with a node of the tree having a particular property. By way of example, in the leftmost branching node of sample $S_1$, a given subclade has a probability p=0.03 of being subclade ACGT and a probability p=0.97 of being subclade ACCT. In an aspect, the conditional probabilities for each node can be configured such that the probabilities sum to 1, e.g., it can be assumed that the branches of each node represent all possible data points that can arise from a given node in the tree structure. Further, while diagram 200 illustrates a binary tree, it should be appreciated that additional branches per node could be processed in a similar manner to that described above.

Once conditional probabilities for respective tree nodes corresponding to the respective measured samples 10 have been determined, features for each sample can be extracted. For instance, as shown in diagram 200, features $F_1$ through $F_n$ can be extracted based on the tree structures for samples $S_1$ through $S_n$, respectively. In an aspect, the extracted features can be based on properties of the samples (e.g., balances for phylogenies, etc.), measurement counts, and/or other factors.

Figure 4:
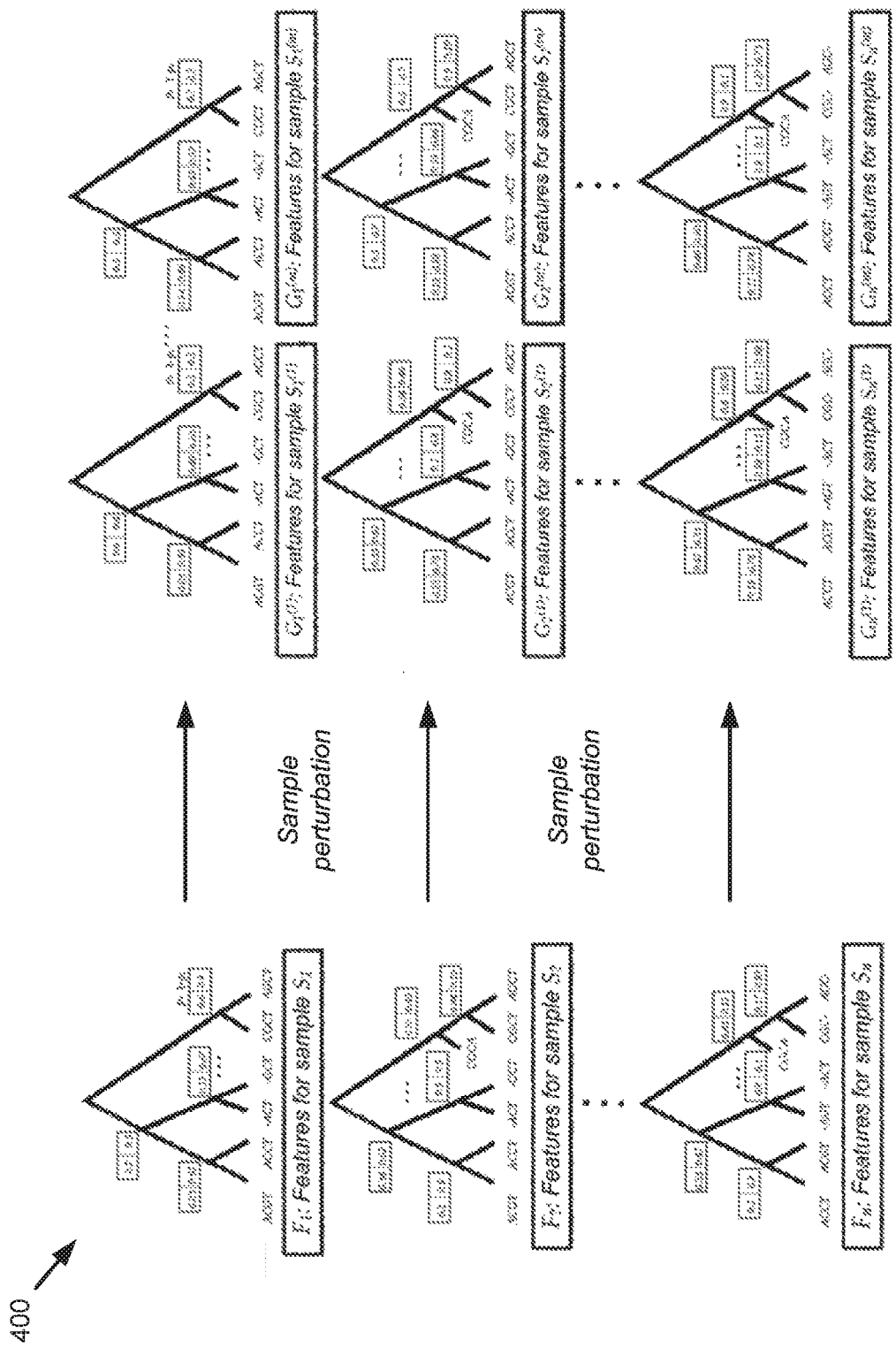
FIG. 4 is a diagram of an example data augmentation process that can be utilized according to one or more embodiments described herein.

Referring now to diagram 400 in FIG. 4, and with further reference to FIG. 1, the data augmentation component 120 can generate synthetic samples 20 from a set of measured samples 10 via a sample perturbation process. In an aspect, for each internal node associated with the measured samples 10 (e.g., according to their respective trees), the generative model component 110 can utilize the observed conditional probabilities as described above to parameterize a generative model. This generative model can, in turn, produce new conditional probabilities, e.g., according to a beta distribution and/or other suitable distributions. Using these models, the data augmentation component 120 can first draw new conditional probabilities and then draw, e.g., from a binomial distribution and/or other posterior distributions depending on the choice of prior distributions, new data points. As shown in diagram 400, these new data points can make up synthetic samples 20 that are similar in structure to the original measured samples 10.

In the example shown in diagram 400, each measured sample 10, e.g., samples $S_1$ through $S_n$, can be utilized to derive a number m of synthetic samples 20, denoted in diagram 400 as $S_1^{(1)}$ through $S_1^{(m)}$ for sample $S_1$, $S_2^{(1)}$ through $S_2^{(m)}$ for sample $S_2$, and so on. While a uniform number of synthetic samples 20 is generated for each measured sample 10 in the example shown in diagram 400, it should be appreciated that various ones of the measured samples 10 can have different numbers of synthetic samples 20, or no synthetic samples 20, derived therefrom depending on use case. For instance, as will be described below with respect to FIG. 8, different numbers of synthetic samples 20 can be generated for certain measured samples 10 in order to balance the resulting dataset, e.g., by mitigating hidden or observed biases in the dataset.

In an aspect, in response to respective synthetic samples 20 being generated by the data augmentation component 120, respective features for the synthetic samples 20, e.g., features $G_1^{(1)}$ through $G_1^{(m)}$ for samples $S_1^{(1)}$ through $S_1^{(m)}$, etc., can be extracted in a similar manner to features $F_1$ through $F_n$ as described above.

Figure 5:
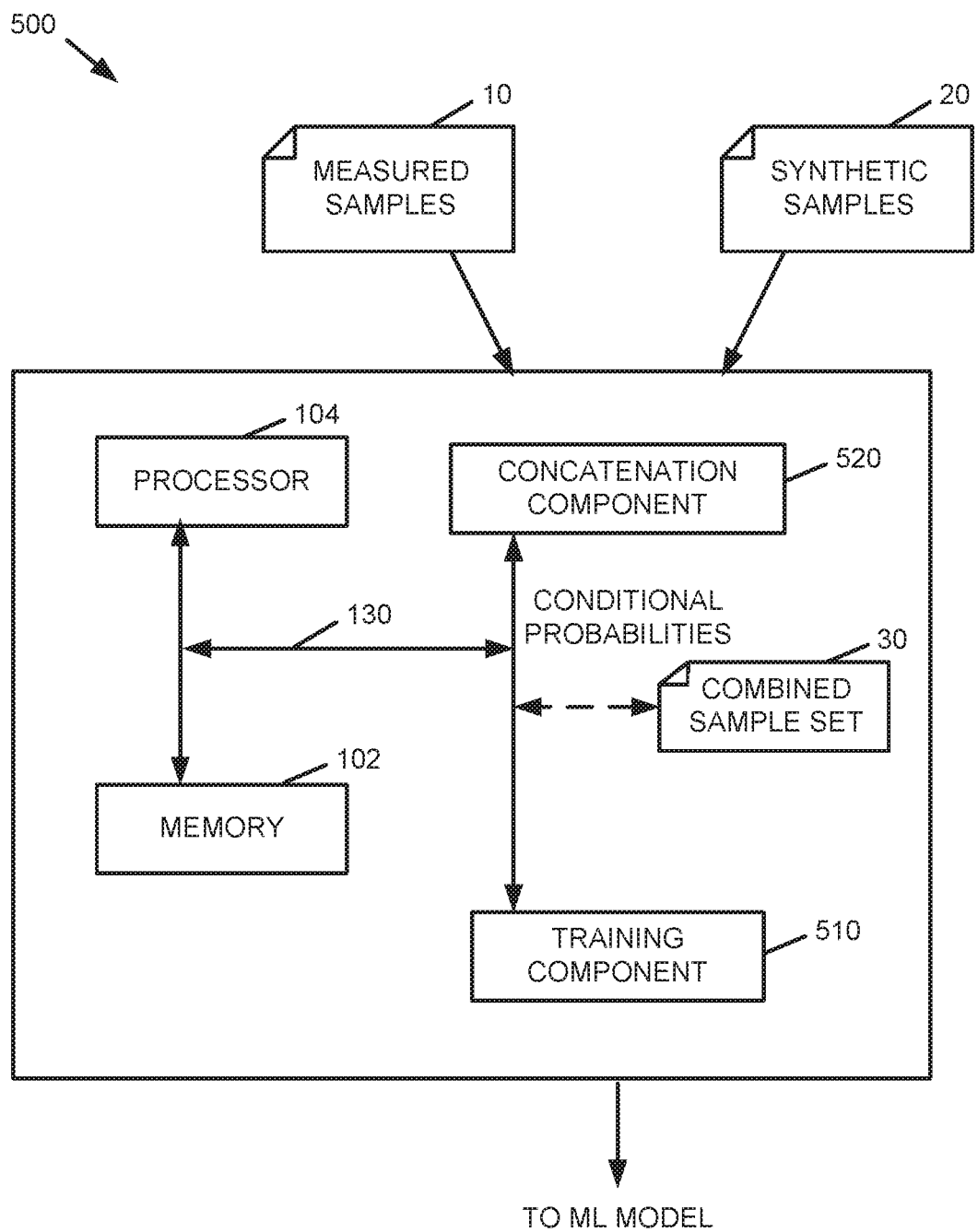
FIG. 5 is a block diagram of a system that facilitates concatenation of measured and synthetic samples according to one or more embodiments described herein.

Turning to FIG. 5, a system 500 that facilitates concatenation of measured and synthetic samples according to one or more embodiments described herein is illustrated. Repetitive description of like elements employed in other embodiments described herein is omitted for sake of brevity. As shown in FIG. 5, system 500 can include a memory 102 that can store computer executable components and a processor 104 that can execute computer executable components stored in the memory 102, in a similar manner to systems 100 and 300 as described above. The computer executable components can include a training component 510 that can provide at least one of measured samples 10 or synthetic samples 20 as training data to a machine learning (ML) model.

In an aspect, the training component 510 can extract features from the respective samples 10, 20, e.g., feature set F corresponding to the measured samples 10 and feature set G corresponding to the synthetic samples 20 as described above with respect to FIG. 2 and FIG. 4, respectively, and provide those features as the training data. Alternatively, features corresponding to the samples 10, 20 can be extracted and/or arranged by other means. For instance, the computer executable components of system 500 can further include a concatenation component 520 that can construct training data for the training component 510 by concatenating sample features extracted from the measured samples 10 and/or the synthetic samples 20, e.g., feature sets F and G as described above. These concatenated features can then be provided as a combined sample set 30 to the training component 510. In embodiments that utilize the concatenation component 520, sample features can be extracted by the concatenation component 520 itself and/or by other components, such as the data augmentation component 120 described above with respect to FIG. 1.

In an aspect, data augmentation desirably operates to add new samples that could have been observed in a measured sample set but are not observed to the training set. As described above, various aspects described herein can achieve this by using a generative model (e.g., as defined by the generative model component 110) to create synthetic samples (e.g., via the data augmentation component 120) that are distributed around existing samples. In an aspect, tree-based associative data augmentation as described herein can model two types of variations:

True variation: This refers to natural variation that can occur between segments of a sampled population. By way of a non-limiting example involving microbiome data, from one individual to another, even among those with the same phenotype, the true proportions of operational taxonomic units (OTUs) in the microbiome can change. True variation can occur due to confounding factors (e.g., hidden variables) or other causes of natural variation among the sampled population. Also, or alternatively, true variation can be caused by changes to a sampled population over time.

Sampling variation: Since sampling takes a random (but not necessarily uniformly random) subsample of the true diversity, the sampling process itself can create additional variation around the true proportions. Additionally, some sampling methods can introduce sampling error that can further increase this variation.

Figure 6:
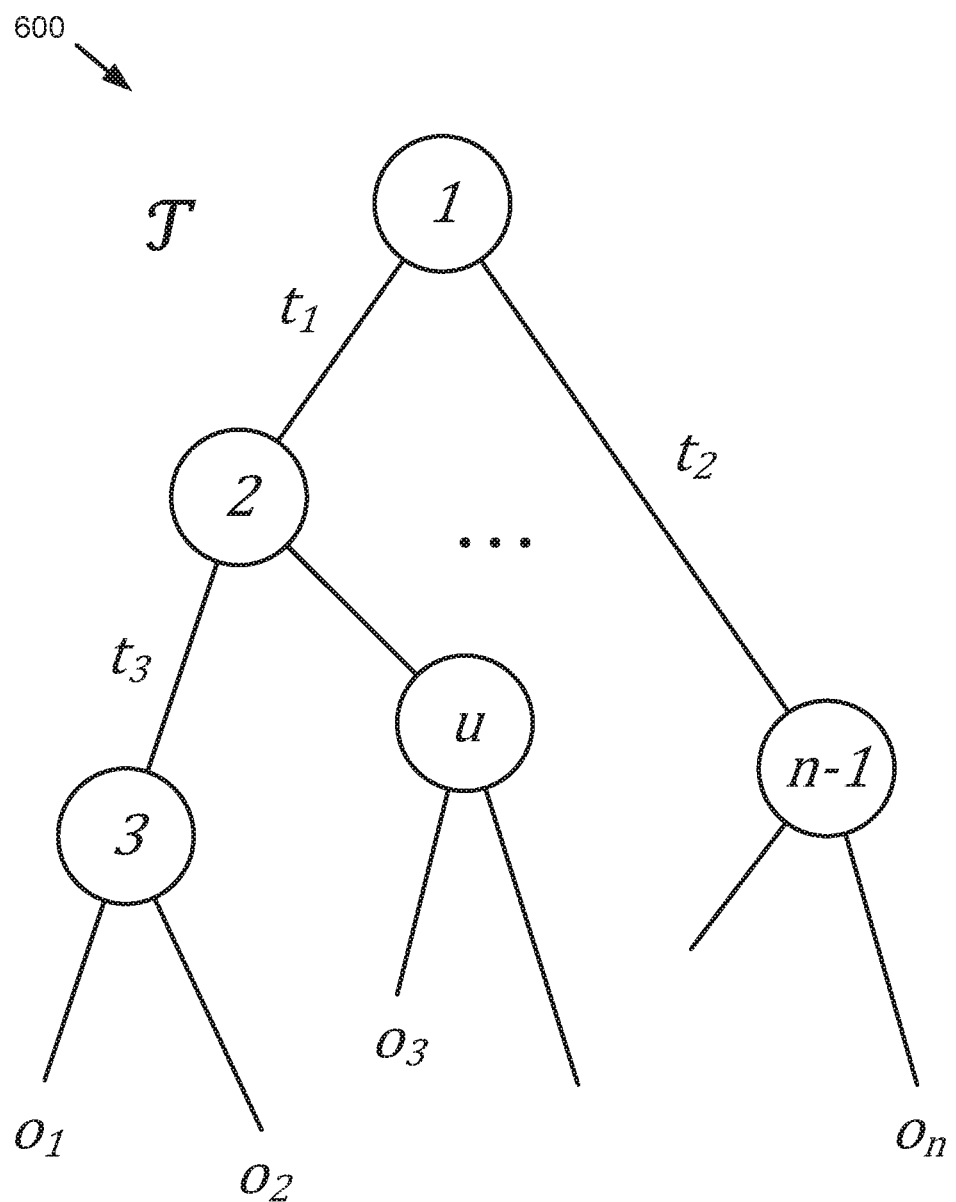
FIG. 6 is a diagram of an example tree structure that can be utilized according to one or more embodiments described herein.

In an aspect, the generative model component 110 can utilize a hierarchical generative model to capture both sources of variation as described above. In one implementation of the generative model component 110, the generative model can utilize a binary tree, denoted as $\mathcal{T}$, with leaves labeled by $o_1$ through $o_n$, as shown by diagram 600 in FIG. 6. As further shown in diagram 600, the internal nodes of $\mathcal{T}$ can be indexed from 1 (e.g., for the root) to n−1, and the length of the edge of above a given node u can be denoted as $t_u$. From tree $\mathcal{T}$, the generative model component 110 can compute $d_u$, or the average length of the path from each leaf under the left subordinate node of node u to each leaf under the right subordinate node of node u.

In another aspect, for a binary tree $\mathcal{T}$, the hierarchical generative model can utilize three sets of parameters: 1) the tree $\mathcal{T}$ and its branch lengths (and/or corresponding $d_u$ values), where the two nodes below each node u are labeled as left (l) and right (r); 2) a set $\mathcal{M} = \{\mu_1, \ldots, \mu_{n-1}\}$, $0 < \mu_u < 1$, respective elements in $\mathcal{M}$ corresponding to internal nodes of the tree; and 3) the total measurement count N for the tree $\mathcal{T}$. In addition, the generative model component 110 can define a value $v_u = f(d_u)$ for respective nodes of the tree, where f is a monotonically increasing function.

Figure 7:
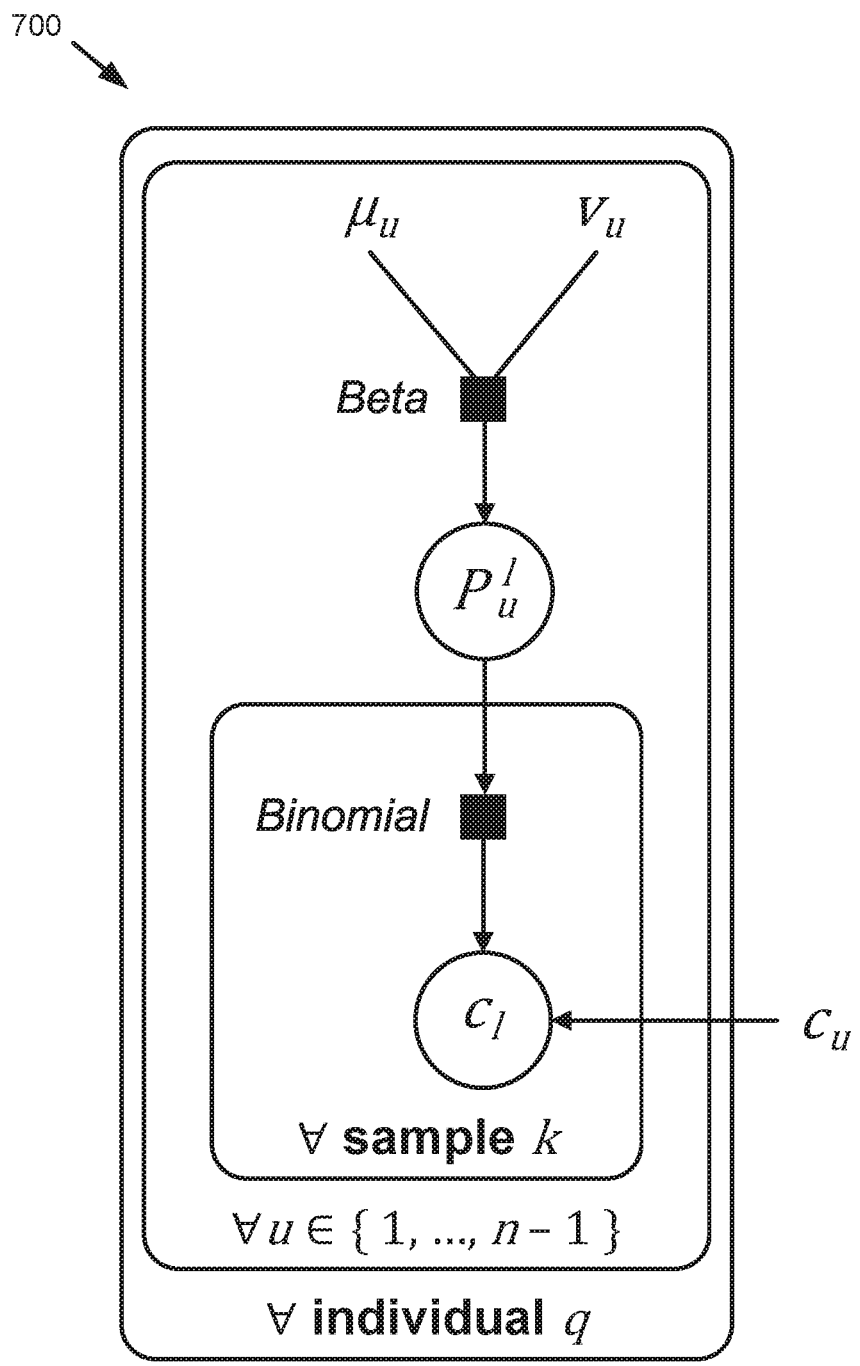
FIG. 7 is a diagram of an example hierarchical graphical model that can be used to generate synthetic samples from a set of measured samples according to one or more embodiments described herein.

Diagram 700 in FIG. 7 illustrates an example generative hierarchical model that can be utilized by the generative model component 110. In an aspect, the model shown in diagram 700 can be defined recursively, beginning at the root of tree $\mathcal{T}$ and traversing the tree top-down. The model can generate q individuals and k new samples for each individual (k×q in total), each of the samples having N measurements. As further shown by diagram 700, true variation can be modeled using a beta distribution, and sampling variation can be modeled using a binomial distribution. Other distributions could also be used. It should be appreciated that the beta distribution shown in diagram 700 utilizes a μ, ν parameterization as opposed to an α, β parameterization.

An example algorithm for operation of the model shown by diagram 700 is given in Table 1 below. For each node u, the parameter $\mu_u$ gives the population-wide portion of data points under node u that fall under the left subtree of u. The generative model component 110 can then draw from a beta distribution to obtain $p_u^l$, or the true portion of data points that go to the left subtree in the underlying dataset. Subsequently, the generative model component 110 can draw from the binomial distribution to obtain the actual observed count $c_l$, and from this the variation due to sampling (sequencing) around the true proportion $p_u^l$ can be modeled.

TABLE 1

Example sample generation procedure.

| | |
|---|---|
| 1: | for individual 1 ≤ i ≤ q do |
| 2: |    for node u in preorder traversal of $\mathcal{T}$ do |
| 3: |       Draw $p_u^l$~Beta($\mu_u$, $\nu_u$) |
| 4: |    for 1 ≤ j ≤ k do |
| 5: |       $c_1 \leftarrow N$    // Index 1 refers to the root node |
| 6: |       for internal node u with subordinate nodes l and r in preorder traversal do |
| 7: |          Draw $c_l$~Binomial($p_u^l$, $c_u$) |
| 8: |          $c_r \leftarrow c_u - c_l$ |
| 9: |       Output $c_{o_1}, \ldots, c_{o_n}$ as a new sample and (optionally) normalize |

Figure 8:
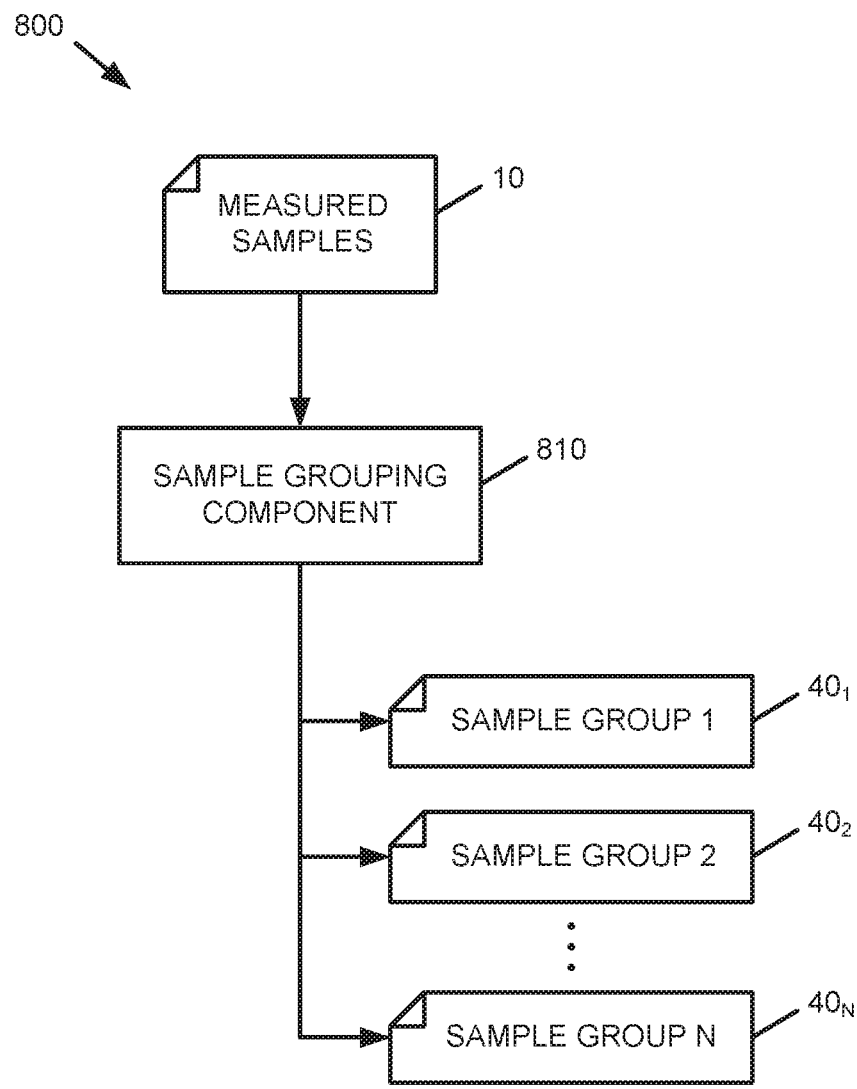
FIG. 8 is a block diagram of a system that facilitates grouping respective measured samples according to one or more factors according to one or more embodiments described herein.

With reference now to FIG. 8, a block diagram of a system 800 that facilitates grouping respective measured samples according to one or more factors according to one or more embodiments described herein is illustrated. Repetitive description of like elements employed in other embodiments described herein is omitted for sake of brevity. As shown in FIG. 8, system 800 includes a sample grouping component 810 (e.g., as implemented via a memory 102 and a processor 104 in a similar manner to systems 100, 300, and 500 as described above) that can group measured samples 10 into respective sample groups (sample clusters) 40. While N sample groups 401-40N are shown in FIG. 8, it should be appreciated that the sample grouping component 810 can group respective measured samples 10 into any suitable number of clusters or other groups, including one group or multiple groups. In an aspect, the sample grouping component 810 can be used to improve the utility of a training dataset in environments with disparate classifications of data. For instance, the sample grouping component 810 can be utilized in scenarios in which samples can belong to one of several classes and/or in which confounding factors are present that create further structure among samples.

Figure 9:
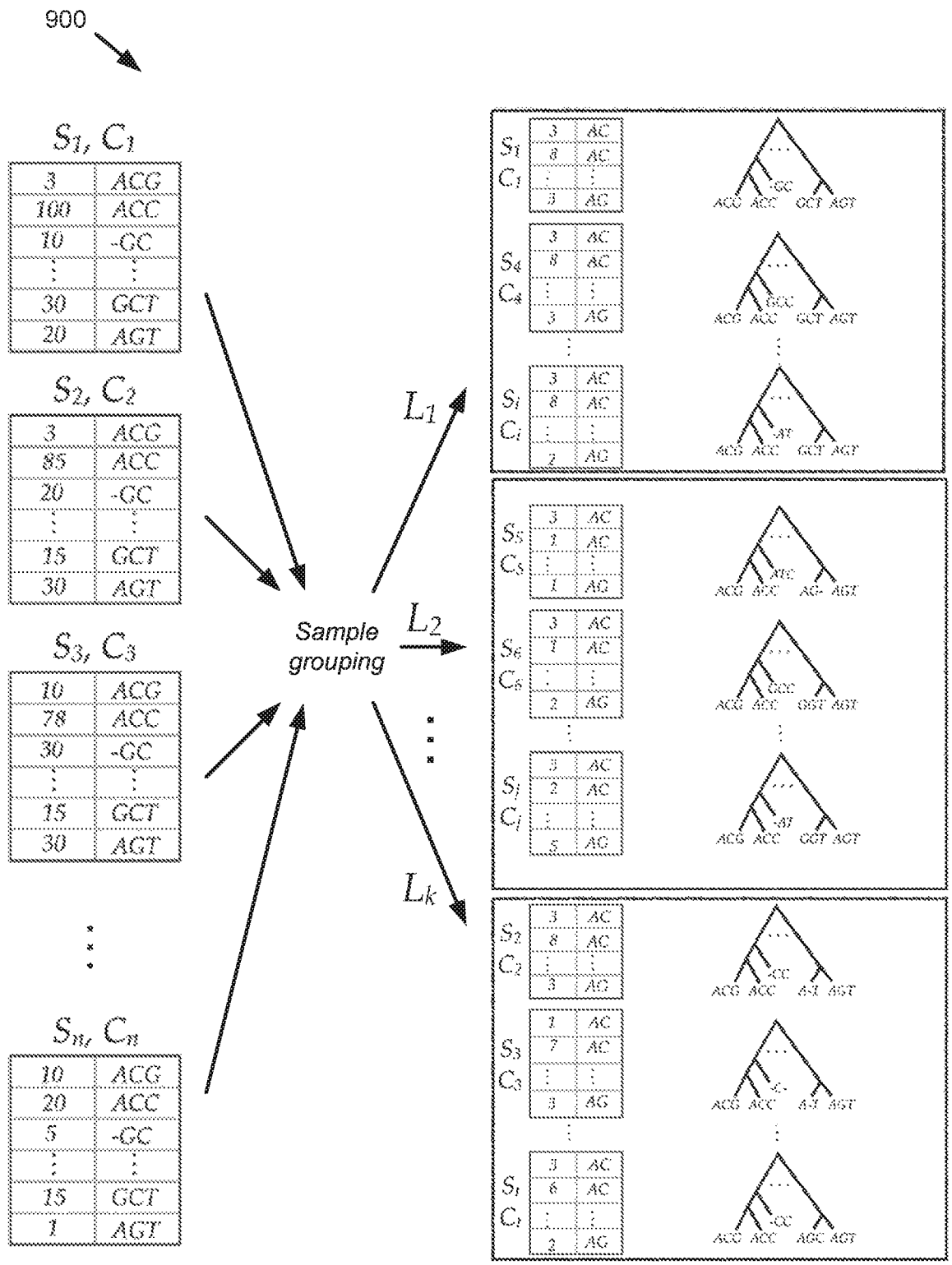
FIG. 9 is a diagram of example sample grouping operations that can be performed according to one or more embodiments described herein.
Figure 10:
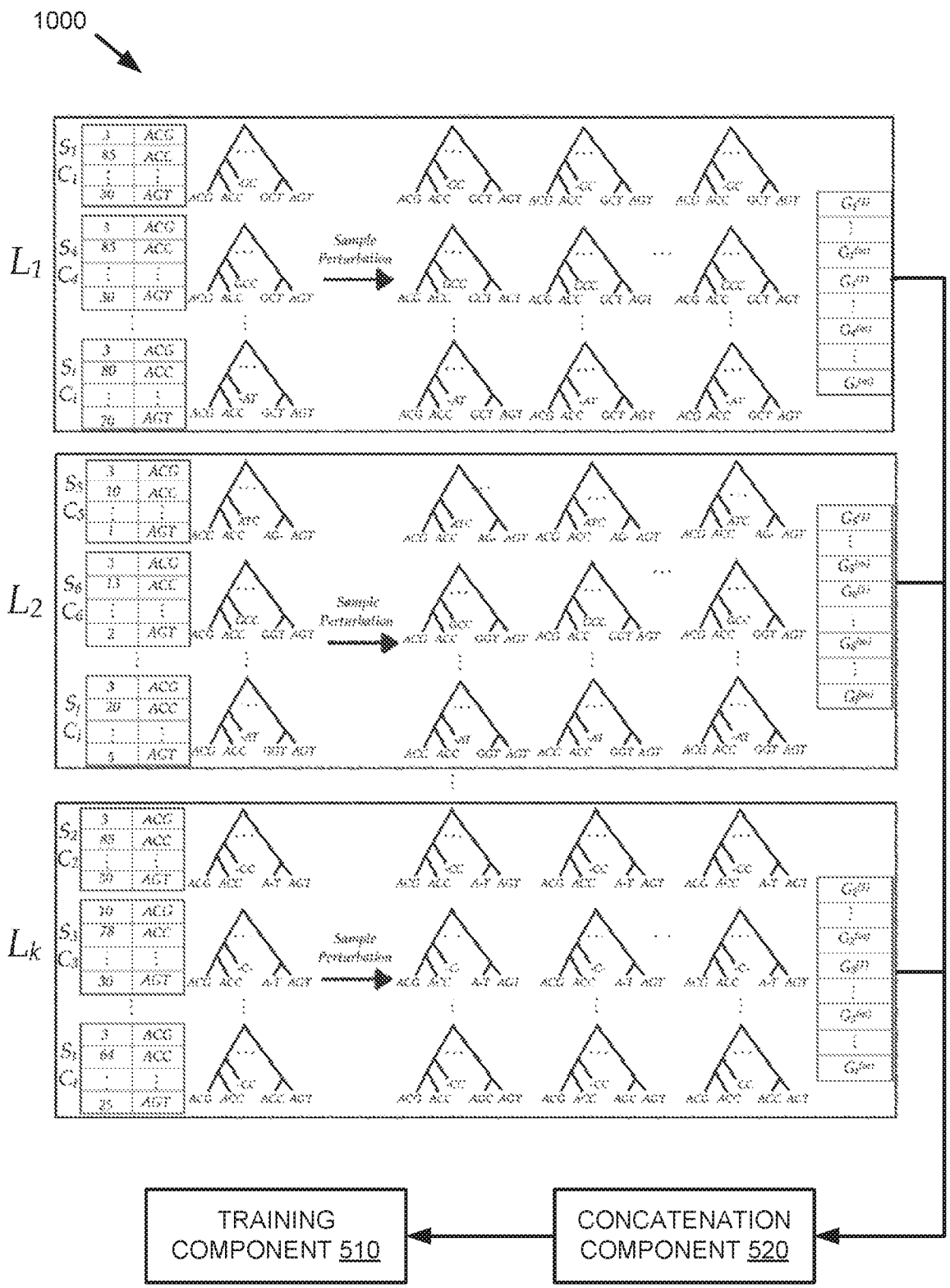
FIG. 10 is a diagram of an example data augmentation process that can be performed for the sample groups of FIG. 9 according to one or more embodiments described herein.

An example of sample grouping that can be performed by the sample grouping component 810 for a set of samples $S_1$ through $S_n$ is shown by diagram 900 in FIG. 9. As shown by diagram 900, the sample grouping component can start from the raw data for each sample, e.g., sequences or other measurements present in the samples, counts for the respective measurements, and class labels for the respective samples (if present). Based on the information associated with the respective samples, the sample grouping component 810 can group the samples into respective sample groups or clusters, here k groups $L_1$ through $L_k$, using one or more grouping techniques. For instance, if class labels are present in the samples, the sample grouping component can cluster samples based on those class labels (e.g., using a supervised grouping algorithm). In addition, or alternatively if class labels are not present, the sample grouping component 810 can group the samples into respective sample clusters based on extracted features associated with the samples, e.g., via an unsupervised clustering algorithm to infer confounding factors in the respective samples. In doing so, the sample grouping component 810 can be utilized to target both hidden and observed biases present in the measured samples 10.

Once the respective samples have been grouped according to their class labels and/or any confounding factors, synthetic samples can be generated from the samples in each sample group, e.g., as described above with respect to FIGS. 1-4 for a single sample group. An example of synthetic sample generation for multiple sample clusters is shown by diagram 1000 in FIG. 10. Once a desired amount of synthetic samples for each cluster has been generated (which can include zero or more synthetic samples for respective ones of the clusters), features from each cluster can be concatenated, e.g., via a concatenation component 520, and passed to a classifier as training data, e.g., via a training component 510, in a similar manner to that described above for a single sample group. To restate the above, the sample grouping component 810 shown in FIG. 8 can facilitate a mixture model in which samples are first assigned to a cluster or other group, and then data augmentation is conducted for respective ones of the clusters.

In an aspect, the data augmentation component 120 can be used in combination with the sample grouping component 810 to facilitate balancing (and/or otherwise adjusting) a training dataset between respective sample groups 40 by generating different numbers of synthetic samples 20 per measured sample 10. More particularly, a set of measured samples 10 can be placed into respective sample groups 40 by the sample grouping component 810 according to various aspects as described above. Next, the number of synthetic samples 20 created by the data augmentation component 120 per measured sample 10 can be selected such that the combined number of measured samples 10 and synthetic samples 20 in each sample group 40 differ by no more than a threshold.

Balancing in the above manner can be achieved in a variety of ways. In one example, the data augmentation component 120 can generate a minimal number of synthetic samples 20 for each cluster such that all sample groups 40 have the same number of samples. Accordingly, in this example, data augmentation can be omitted for a sample group 40 having the greatest number of measured samples 10 relative to the other sample groups 40. In another example, the data augmentation component 120 can generate sufficient numbers of synthetic samples 20 for each sample group 40 such that each sample group 40 contains the same combined number of samples and such that the sample group 40 with the largest number of measured samples 10 contains q times more samples than before augmentation for some real value of q. In general, the data augmentation component 120 can generate numbers of zero or more synthetic samples 20 for respective sample groups 40 or sample clusters such that those sample groups 40 have a uniform combined number of measured samples 10 and synthetic samples 20 across the respective sample groups 40.

Figure 11:
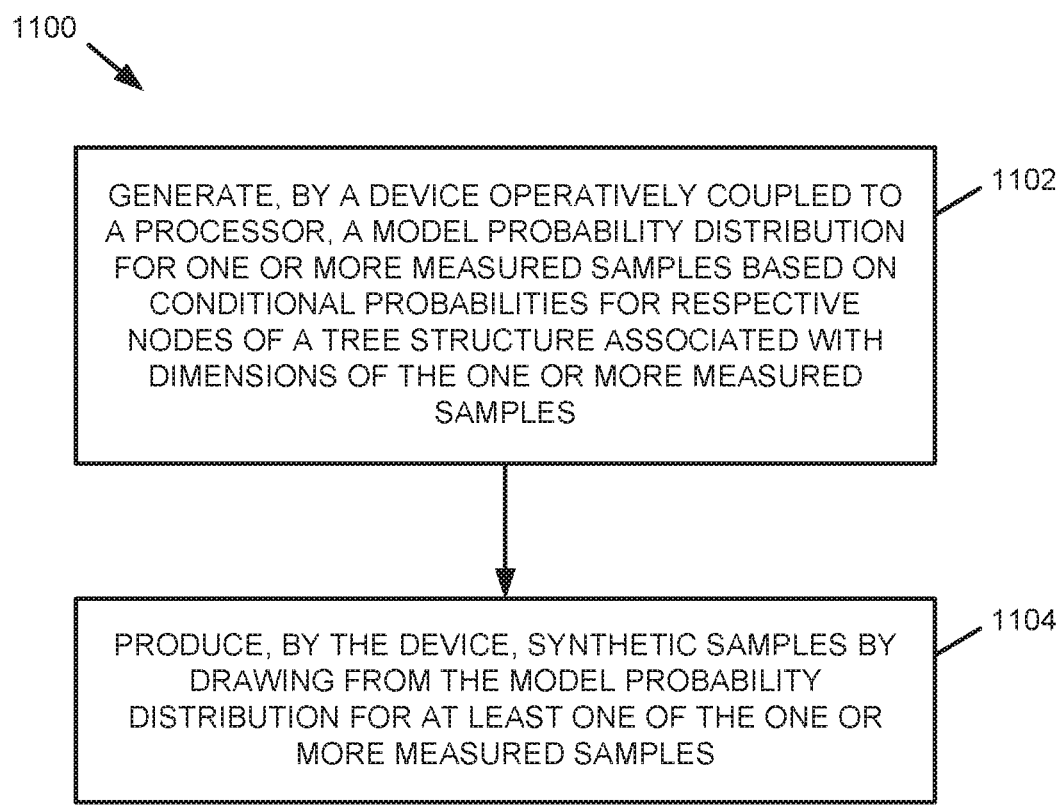
FIGS. 11-13 are flow diagrams of example, non-limiting computer-implemented methods that facilitate tree-based associative data augmentation according to one or more embodiments described herein.

FIG. 11 illustrates a flow diagram of an example, non-limiting computer-implemented method 1100 that facilitates tree-based associative data augmentation according to one or more embodiments described herein. Repetitive description of like elements employed in other embodiments described herein is omitted for sake of brevity.

At 1102, a device operatively coupled to a processor (e.g., processor 104) can generate (e.g., by a generative model component 110) a model probability distribution for one or more measured samples based on conditional probabilities for respective nodes of a tree structure associated with dimensions of the one or more measured samples.

At 1104, the device can produce (e.g., by a data augmentation component 120) synthetic samples by drawing from the model probability distribution generated at 1102 for at least one of the one or more measured samples.

Figure 12:
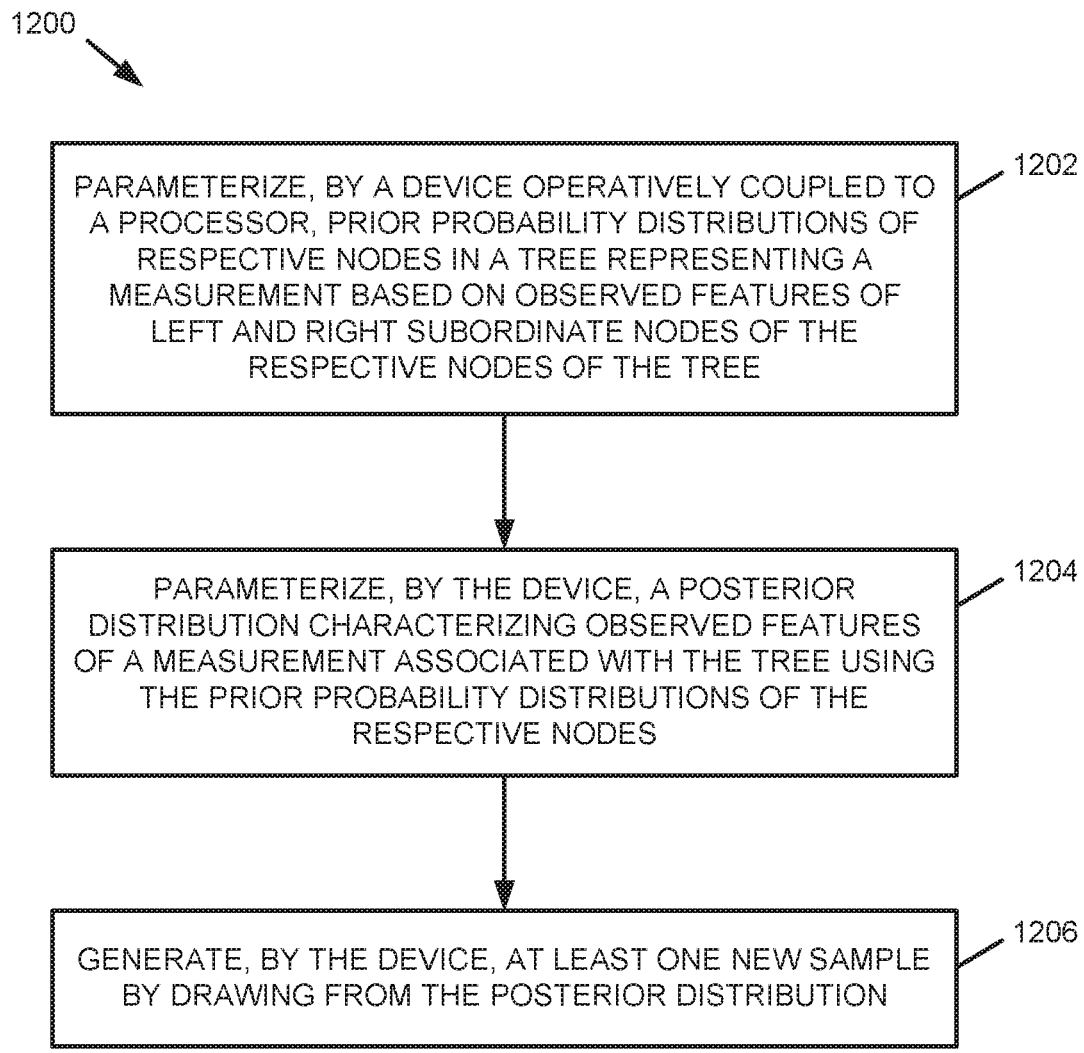

FIG. 12 illustrates a flow diagram of another example, non-limiting computer-implemented method 1200 that facilitates tree-based associative data augmentation according to one or more embodiments described herein. Repetitive description of like elements employed in other embodiments described herein is omitted for sake of brevity.

At 1202, a device operatively coupled to a processor (e.g., processor 104) can parameterize (e.g., by a generative model component 110) prior probability distributions of respective nodes in a tree representing a measurement (e.g., corresponding to a measured sample 10) based on observed features of left and right subordinate nodes of the respective nodes of the tree.

At 1204, the device can parameterize (e.g., by the generative model component 110) a posterior distribution characterizing observed features of a measurement associated with the tree using the prior probability distributions of the respective nodes as parameterized at 1202.

At 1206, the device can generate (e.g., by a data augmentation component 120) at least one new sample (e.g., a synthetic sample 20) by drawing from the posterior distribution parameterized at 1204. In an aspect, the at least one new sample can include a synthetic measurement corresponding to the measurement associated with the tree.

Figure 13:
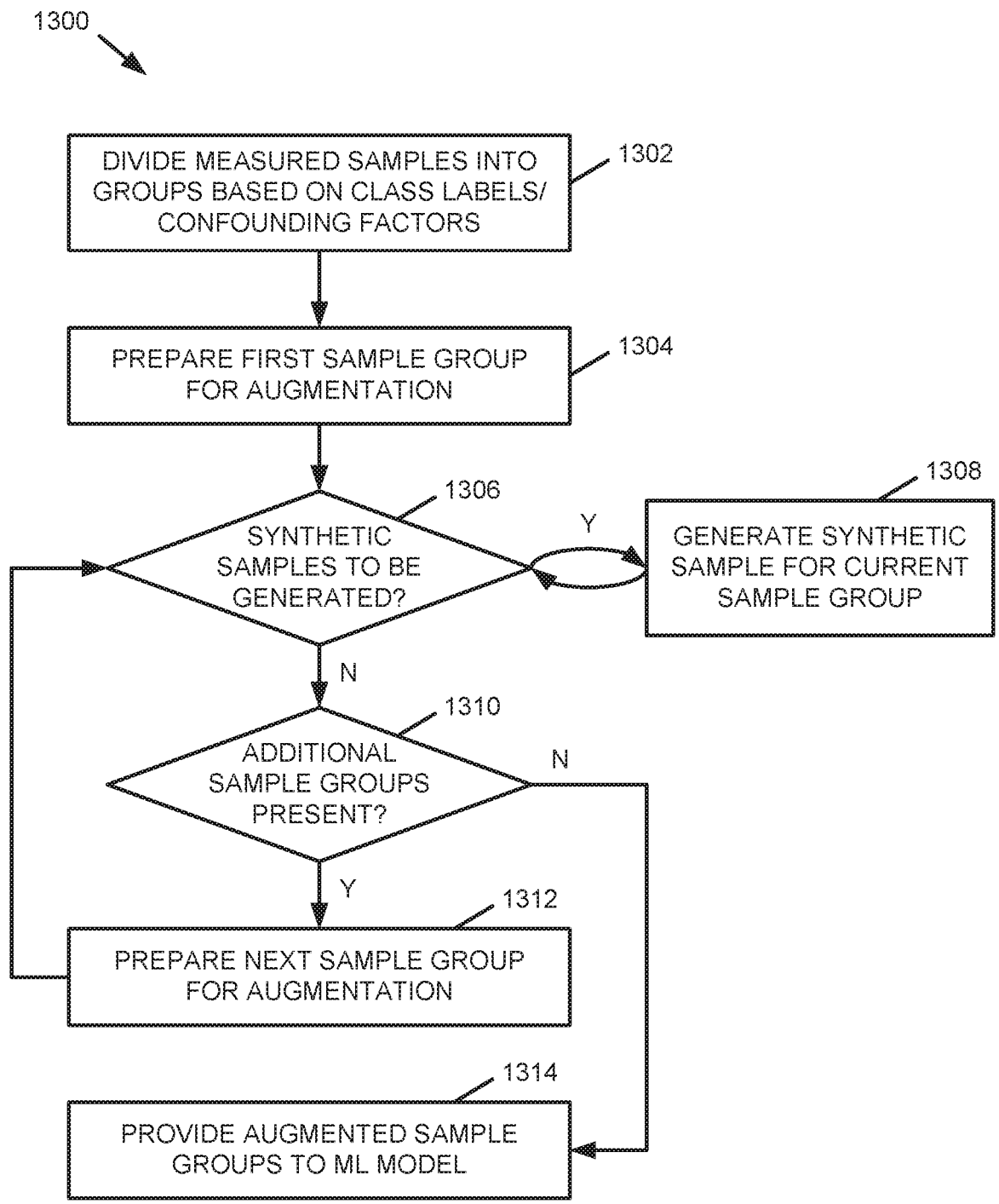

FIG. 13 illustrates a flow diagram of a further example, non-limiting computer-implemented method 1300 that facilitates tree-based associative data augmentation according to one or more embodiments described herein. Repetitive description of like elements employed in other embodiments described herein is omitted for sake of brevity.

At 1302, a device operatively coupled to a processor (e.g., processor 104) can divide (e.g., by a sample grouping component 810) a set of measured samples (e.g., measured samples 10) into respective sample groups according to class labels associated with the measured samples, confounding factors associated with the measured samples (e.g., as identified by a clustering algorithm and/or other suitable means), and/or other factors. In an aspect, sample grouping as performed at 1302 can result in the given set of measured samples being grouped into one sample group or multiple sample groups.

At 1304, a first (or only) sample group generated at 1302 can be prepared for data augmentation. For instance, a generative model for the respective sample groups generated at 1302 can be created in accordance with respective embodiments as described above.

At 1306, a determination is made regarding whether synthetic samples (e.g., synthetic samples 20) remain to be generated for the current sample group. In an aspect, this determination can be made based on a desired combined number of measured and synthetic samples for respective ones of the sample groups generated at 1302. If synthetic samples remain to be generated, method 1300 proceeds from 1306 to 1308, where a synthetic sample is generated (e.g., by a data augmentation component 120) for the current sample group. Method 1300 then returns to 1306 to determine whether further synthetic samples are desired, and the actions described at 1306 and 1308 can be repeated until the desired number of synthetic samples for the sample group have been generated.

Once no synthetic samples for the current sample group remain to be generated, method 1300 proceeds to 1310, in which a determination is made regarding whether further unprocessed sample groups as generated at 1302 are present. If additional sample groups are present, method 1300 proceeds from 1310 to 1312, where the next sample group is prepared for augmentation as described above at 1306 and 1308. If no further sample groups remain, method 1300 can conclude at 1314 by providing (e.g., by a training component 510 and/or a concatenation component 520) the augmented sample groups to an associated machine learning model.

For simplicity of explanation, the computer-implemented methodologies provided herein are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components. For example, a human is unable to generate data for transmission over a wired network and/or a wireless network between processing components, etc. Moreover, a human is unable to packetize data that can include a sequence of bits corresponding to information generated during one or more processes as described above, transmit data that can include a sequence of bits corresponding to information generated during one or more processes as described above, etc.

Figure 14:
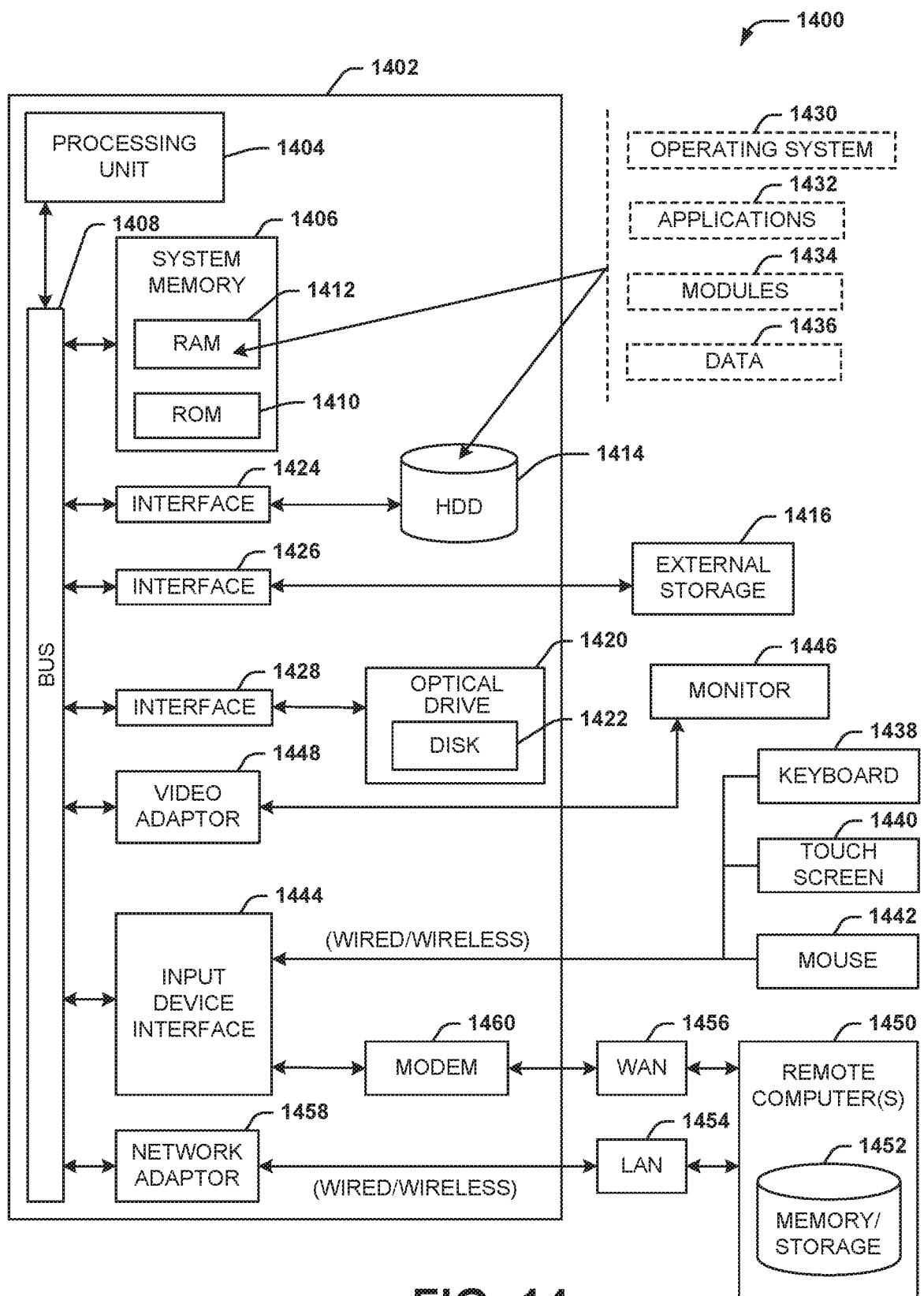
FIG. 14 is a block diagram of an example, non-limiting operating environment in which one or more embodiments described herein can be implemented.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While portions of the subject matter have been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory that stores computer executable components; and
    a processor that executes computer executable components stored in the memory, wherein the computer executable components comprise:
        a generative model component that defines a probability distribution, the probability distribution being parameterized based on one or more measured samples using conditional probabilities determined for respective nodes of a tree structure associated with dimensions of the one or more measured samples;
        a data augmentation component that generates synthetic samples based on the probability distribution for at least one of the one or more measured samples, wherein the data augmentation component incorporates tree-based hierarchical structures that relate inter-sample patterns to generate the synthetic samples such that the synthetic samples are constrained based on the inter-sample patterns and relationships; and
        a training component that performs training via a machine learning model based on a sample from the one or more measured samples and the synthetic samples.

2. The system of claim 1, wherein the computer executable components further comprise:
    a sample processing component that determines the conditional probabilities for the respective nodes of the tree structure associated with the dimensions of sample measurements for the one or more measured samples.

3. The system of claim 1, wherein the
    training component also provides the sample selected from the group consisting of (i) a measured sample of the one or more measured samples and (ii) a synthetic sample of the synthetic samples as training data to a machine learning model.

4. The system of claim 3, wherein the computer executable components further comprise:
    a concatenation component that constructs the training data by concatenating sample features, the sample features being selected from the group consisting of (i) first features extracted from at least one of the one or more measured samples and (ii) second features extracted from at least one of the synthetic samples.

5. The system of claim 1, wherein the one or more measured samples comprise a plurality of measured samples, and wherein the computer executable components further comprise:
    a sample grouping component that groups measured samples into respective sample clusters.

6. The system of claim 5, wherein the sample grouping component groups the measured samples into the respective sample clusters based on extracted features associated with the one or more measured samples.

7. The system of claim 5, wherein the sample grouping component groups the measured samples into the respective sample clusters based on class labels associated with the one or more measured samples.

8. The system of claim 5, wherein the data augmentation component generates numbers of one or more synthetic samples for respective ones of the respective sample clusters such that the respective sample clusters comprise a uniform combined number of the measured samples and the one or more synthetic samples across the respective sample clusters.

9. A computer-implemented method comprising:
    generating, by a device operatively coupled to a processor, a model probability distribution for one or more measured samples based on conditional probabilities for respective nodes of a tree structure associated with dimensions of the one or more measured samples; and
    producing, by the device, synthetic samples from the model probability distribution for at least one of the one or more measured samples, wherein the data augmentation component incorporates tree-based hierarchical structures that relate inter-sample patterns to generate the synthetic samples such that the synthetic samples are constrained based on the inter-sample patterns and relationships.

10. The computer-implemented method of claim 9, further comprising:
providing, by the device, respective features of a sample selected from the group consisting of (i) a measured sample of the one or more measured samples and (ii) a synthetic sample of the synthetic samples as training data to a machine learning model.

11. The computer-implemented method of claim 9, wherein the computer-implemented method further comprises:
grouping, by the device, the one or more measured samples into sample clusters.

12. The computer-implemented method of claim 11, wherein the grouping comprises grouping the one or more measured samples into respective ones of the sample clusters based on extracted features associated with the one or more measured samples.

13. The computer-implemented method of claim 11, wherein the grouping comprises grouping the one or more measured samples into respective ones of the sample clusters based on class labels associated with the one or more measured samples.

14. The computer-implemented method of claim 11, wherein the producing comprises producing a number of one or more synthetic samples for respective ones of the sample clusters such that the sample clusters respectively comprise a uniform combined number of the one or more measured samples and the one or more synthetic samples across the sample clusters.

15. A computer program product for tree-based associative data augmentation, the computer program product comprising a computer readable storage medium having program instructions embodied therewith, the program instructions executable by a processor to cause the processor to:
generate a model probability distribution for one or more measured samples based on conditional probabilities for respective nodes of a tree structure associated with dimensions of the one or more measured samples; and
produce synthetic samples from the model probability distribution for at least one of the one or more measured samples, wherein the production comprises incorporation of tree-based hierarchical structures that relate inter-sample patterns to generate the synthetic samples such that the synthetic samples are constrained based on the inter-sample patterns and relationships.

16. The computer program product of claim 15, wherein the program instructions further cause the processor to:
provide respective features of a sample selected from the group consisting of (i) a measured sample of the one or more measured samples and (ii) a synthetic sample of the synthetic samples as training data to a machine learning model.

17. The computer program product of claim 15, wherein the program instructions further cause the processor to:
group the one or more measured samples into sample clusters.

18. The computer program product of claim 17, wherein the program instructions further cause the processor to:
group the one or more measured samples into the sample clusters based on a similarity of extracted features associated with the one or more measured samples.

19. The computer program product of claim 17, wherein the program instructions further cause the processor to:
group the one or more measured samples into the sample clusters based on class labels associated with the one or more measured samples.

20. The computer program product of claim 17, wherein the program instructions further cause the processor to:
produce a number of one or more synthetic samples for respective ones of the sample clusters such that the sample clusters respectively comprise a uniform combined number of the one or more measured samples and the one or more synthetic samples across the sample clusters.

21. A computer-implemented method, comprising:
parameterizing, by a device operatively coupled to a processor, prior probability distributions of respective nodes in a tree representing a measurement based on observed features of left and right subordinate nodes of the respective nodes of the tree;
parameterizing, by the device, a posterior distribution characterizing observed features of the measurement associated with the tree using the prior probability distributions of the respective nodes of the tree; and
generating, by the device, at least one new sample from the posterior distribution, wherein the at least one new sample comprises a synthetic measurement corresponding to the measurement associated with the tree, wherein the generating comprises incorporating tree-based hierarchical structures that relate inter-sample patterns to generate the at least one synthetic sample such that the at least one synthetic sample is constrained based on the inter-sample patterns and relationships.

22. The computer-implemented method of claim 21, further comprising:
normalizing, by the device, the at least one new sample.

23. The computer-implemented method of claim 21, wherein the measurement is a first measurement, and wherein the computer-implemented method further comprises:
providing, by the device, a set of measurements that includes the first measurement, wherein respective measurements of the set of measurements are associated with respective trees corresponding to domain knowledge of the respective measurements of the set of measurements; and
inferring, by the device, conditional probabilities for the first measurement using the tree corresponding to the first measurement; and
extracting, by the device, features for respective measurements of the set of measurements.

24. The computer-implemented method of claim 23, further comprising:
in response to the measurements of the set of measurements being labeled, balancing, by the device, a number of measurements across respective labels associated with the set of measurements via the generating.

25. The computer-implemented method of claim 23, further comprising:
in response to the measurements of the set of measurements being unlabeled, clustering, by the device, the set of measurements using the features for the respective measurements of the set of measurements.

* * * * *